United States Patent [19]

Michalko

[11] 4,129,522
[45] Dec. 12, 1978

[54] PREPARATION OF SILICA-ALUMINA MACROSPHERES
[75] Inventor: Edward Michalko, Chicago, Ill.
[73] Assignee: UOP Inc., Des Plaines, Ill.
[21] Appl. No.: 848,171
[22] Filed: Nov. 3, 1977
[51] Int. Cl.$^2$ .............................................. B01J 37/02
[52] U.S. Cl. ................................ 252/453; 252/455 R
[58] Field of Search ........................... 252/455 R, 453; 208/111

[56] References Cited

U.S. PATENT DOCUMENTS

| | | | |
|---|---|---|---|
| 3,905,916 | 9/1975 | Riley et al. | 252/455 R |
| 3,972,833 | 8/1976 | Michalko et al. | 252/455 R |
| 3,993,589 | 11/1976 | Andre et al. | 252/455 R |
| 3,998,721 | 12/1976 | O'Hara | 208/111 |
| 4,061,563 | 12/1977 | Hilfman | 208/111 |

Primary Examiner—George Crasanakis
Attorney, Agent, or Firm—James R. Hoatson, Jr.; Robert W. Welch; William H. Page, II

[57] ABSTRACT

An improved method of preparing silica-alumina macrospheres is disclosed. An alkali metal silicate solution is acidified with a strong mineral acid and a weak organic acid. The resulting silica sol is admixed with an acidic alumina sol and urea and the mixture is dispersed as droplets in a hot oil bath with the formation of firm spheroidal hydrogel particles. The method insures the formation of firm hydrogel particles which will retain their structural integrity during further processing. The hydrogel spheres are aged, washed, dried and calcined in accordance with prior art methods.

10 Claims, No Drawings

PREPARATION OF SILICA-ALUMINA MACROSPHERES

This invention relates to the manufacture of silica-alumina macrospheres. Spheroidal silica-alumina particles of macro dimension offer numerous advantages, particularly when employed as a catalyst, or as a catalyst support, in a fixed bed type of operation. When so employed, said particles permit a more uniform packing whereby variations in pressure drop across the bed are minimized, and the tendency of a reactant stream to channel through the bed is substantially obviated.

Silica-alumina macrospheres have heretofore been prepared by the well-known oil-drop method. Briefly, the method comprises commingling an acidic silica sol, usually an acidified sodium silicate solution, with an acidic alumina sol and with a weak base which is substantially stable at normal temperatures but increasingly hydrolyzable or decomposable to ammonia with increasing temperature. The mixture is dispersed as droplets in a hot oil bath, frequently referred to as forming oil, and generally contained in a vertical column or forming tower. The forming oil is typically a light gas oil chosen principally for its high interfacial tension with respect to water. Thus, as each droplet penetrates the oil surface, it draws into a spheroidal shape. The droplets are principally water at this stage and, being insoluble in the oil, they tend to assume a shape having the least surface area for its volume.

A second effect is that the formed hydrosol droplets gravitating to the bottom of the forming oil are progressively gelled to a stage sufficient to maintain the structural integrity of the resulting hydrogel spheres, that is, gelled to a stage whereby the spheres are formed into hydrogel particles which will not agglomerate to form a mass or cluster precluding further processing of the spheres. The structural integrity of the spheres is, at this stage, largely attributable to the silica sol which, for the most part, is set or gelled thermally as the droplets gravitate through the hot forming oil.

A critical factor at this stage concerns the acid anion/alkali metal ratio of the acidic silica sol. For example, silica-alumina hydrosol spheres manufactured with a silica hydrosol comprising acid anions and alkali metal in a ratio in excess of about 1.2 are less apt to gel in the forming tower, while a silica sol with an acidic anion/alkali metal ratio of less than about 1.05 could well make the hydrosol unstable and subject to premature gelation. This is of particular concern in a continuous type of commercial operation where, in the acidification of the alkali metal silicate solution, an inadvertant variation in the acid or alkali metal silicate solution charge rates can upset the critical acid anion/alkali metal balance to adversely effect not only the product yield but also product uniformity and reproduceability.

It is therefore an object of this invention to present an improved oil-drop method for the manufacture of silica-alumina macrospheres. More specifically, it is an object of this invention to present a method which will insure the formation of firm hydrogel spheres during the oil-drop process.

In one of its broad aspects, the present invention embodies a method of preparing silica-alumina macrospheres which comprises acidifying an aqueous alkali metal silicate solution with a strong mineral acid and a weak organic acid, the former being in sufficient concentration to provide an acid anion/alkali metal ratio of from about 0.75 to about 1.0, and the latter being in sufficient concentration to increase said ratio by a factor of from about 1.3 to about 2; admixing the acidified solution with an acidic alumina sol and with sufficient urea to effect from about 150 to about 250% neutralization of the acid anion content of the mixture upon total hydrolysis or decomposition of said urea to ammonia; dispersing the mixture as droplets in a hot oil bath effecting the formation of spheroidal hydrogel particles; aging the particles in the hot oil; and washing, drying and calcining the aged particles.

Another embodiment relates to a method which comprises acidifying an aqueous sodium silicate solution with hydrochloric and acetic acids, the former being in sufficient concentration to provide an acid anion/sodium ratio of from about 0.75 to about 1.0, and the latter being in sufficient concentration to increase said ratio by a factor of from about 1.3 to about 2; admixing the acidified solution with an aluminum chloride sol and sufficient urea to effect from about 150 to about 250% neutralization of the acid anion content of the mixture upon total decomposition or hydrolysis of said urea to ammonia; dispersing the mixture as droplets in a hot oil bath and effecting the formation of spheroidal hydrogel particles; aging the particles in the hot oil; and washing, drying, and calcining the aged particles at a temperature of from about 425° to about 750° C.

One of the more specific embodiments of this invention is in a method of preparing silica-alumina macrospheres which comprises acidifying an aqueous sodium silicate solution with hydrochloric and acetic acids, the former being in sufficient concentration to provide an acid anion/sodium ratio of from about 0.75 to about 1.0, and the latter being in sufficient concentration to increase said ratio by a factor of from about 1.3 to about 2; admixing the acidified solution with an aluminum hydroxychloride sol containing from about 10 to about 14 wt. % aluminum in from about a 1 to a 1.5 wt. ratio with the chloride anion content thereof, and with sufficient urea to effect from about 150 to about 250% neutralization of the acid anion content of the mixture upon total decomposition or hydrolysis of said urea to ammonia; dispersing the mixture as droplets in an oil bath maintained at a temperature of from about 50° to about 105° C. and effecting the formation of spheroidal hydrogel particles; aging the particles in the hot oil for a period of from about 10 to about 40 hours; and washing, drying, and calcining the aged particles at a temperature of from about 425° to about 750° C.

Further objects and embodiments of this invention will become apparent in the following detailed specification.

Acidification of the aqueous alkali metal silicate solution to provide a silica hydrosol is typically carried out by admixing the solution with a strong mineral acid such as hydrochloric acid, sulfuric acid, and the like. The alkali metal silicate solution is most often a sodium silicate solution commonly referred to as water glass. It is a preferred practice to dilute the alkali metal silicate solution to establish a silica concentration of from about 5 to about 16 wt. %, and to admix the diluted solution with from about a 10 to about a 30 wt. % aqueous hydrochloric or sulfuric acid solution. The mixing is preferably effected at a temperature of less than about 35° C., and maintained at said temperature with stirring to inhibit polymerization of the resulting silicic acid prior to admixture with the acidic alumina sol and dispersion as droplets in the hot oil bath. Pursuant to the present invention, sufficient of the selected strong mineral acid is employed to provide an acidified alkali metal silicate solution with an acid anion/alkali metal ratio of from about 0.75 to about 1.0, and sufficient of a weak organic acid is employed to increase said ratio by a factor of from about 1.3 to about 2. In this manner, the buffering action afforded by the weak organic acid precludes an upset in the critical acid anion/alkali metal balance of the silica hydrosol, prior to dropping through the hot oil bath as heretofore described. The weak organic acid is preferably acetic acid, and more preferably glacial acetic acid. Other water soluble carboxylic acids which may be employed include formic acid, propionic acid, butyric acid, oxalic acid, malonic acid, succinic acid, glutaric acid, maleic acid, citric acid, and the like.

The acidic alumina sol herein contemplated is such as is prepared by the hydrolysis of an acid salt of aluminum, such as aluminum chloride, in aqueous solution, and treating said solution at conditions to reduce the resulting chloride anion concentration thereof, as by neutralization, to achieve an aluminum/chloride anion wt. ratio of from about 1:1 to about 1.5:1. Reduction in the acid anion concentration may be accomplished in any conventional or otherwise convenient manner. Thus, the acid anion concentration can be reduced by utilizing aluminum metal as a neutralizing agent. In this case, the salt of neutralization is an aluminum salt subject to hydrolysis and ultimate sol formation. In some cases, as in the case of aluminum acetate, where the acid anion is sufficiently volatile, the desired anion deficiency is created simply by heating. Another method of producing a suitable alumina hydrosol is in the electrolysis of an aluminum salt solution, for example an aqueous aluminum chloride solution, in an electrolytic cell having a porous partition between the anode and the cathode whereby an acid anion deficiency is effected in the cathode compartment with the formation of an alumina hydrosol therein. In any case, the alumina sol is utilized in an amount to provide a silica-alumina product comprising from about 25 to about 75 wt. % alumina.

Preferably, the alumina hydrosol is an aluminum chloride hydrosol, variously referred to as an aluminum oxychloride hydrosol, aluminum hydroxychloride hydrosol, and the like, such as is formed utilizing aluminum metal as a neutralizing agent in conjunction with an aqueous aluminum chloride solution. The aluminum chloride hydrosol is typically prepared by digesting aluminum in aqueous hydrochloric acid and/or aluminum chloride solution at about reflux temperature, usually from about 80° to about 105° C., and reducing the chloride anion concentration of the resulting aluminum chloride solution by the device of maintaining an excess of the aluminum reactant in the reaction mixture as a neutralizing agent. In any case, the aluminum chloride hydrosol is prepared to contain from about 10 to about 14 wt. % aluminum in from about a 1:1 to about a 1.5 wt. ratio with the chloride anion content thereof.

Pursuant to the present invention, the acidified alkali metal silicate solution is admixed with the acidic alumina sol and with sufficient urea to effect from about 150 to about 250% neutralization of the acid anion content of the mixture upon total hydrolysis or decomposition of the urea to ammonia.

Gelation of the acidic alumina sol in admixture with the acidic silica sol is largely effected during the subsequent aging of the spheroidal particles utilizing ammonia as a gelling agent and urea as an ammonia precursor, the urea being substantially stable at normal temperatures but increasingly decomposable to ammonia with increasing temperature. Only a fraction of the urea included in the silica sol-alumina sol mixture is hydrolyzed to ammonia in the relatively brief period during which the droplets gravitate through the hot forming oil. However, the residual urea retained in the spheroidal hydrogel particles continues to hydrolize during the subsequent aging process and effect a further gelation whereby desirable pore characteristics of the silica-alumina product are established.

The aging process is suitably effected over a period of from about 10 to about 40 hours, preferably in the hot forming oil, not necessariliy in the forming tower, and usually in a separate facility. The spheres are suitably aged at a temperature of from about 50° to about 105° C., although the aging can be accelerated at a higher temperature up to about 260° C. at a pressure to maintain the water content of the spheres in a substantially liquid phase. The spheroidal particles are advantageously aged in the hot forming oil at a temperature of from about 50° to about 160° C., and at a pressure of from about 40 to about 150 psig. whereby the water content of the spheres is maintained in the liquid phase.

After the aging treatment, the spheres are washed in any suitable manner. A particularly satisfactory method is to wash the spheres by percolation, either with an upward or downward flow of water, and preferably with water containing a small amount of ammonium hydroxide and/or ammonium nitrate. After washing, the spheres may be dried at a temperature of from about 95° to about 350° C. for 2 to 24 hours or more, or dried at this temperature and calcined at a temperature of from about 425° to about 760° C. for 2 to 12 hours or more, and utilized as such or composited with other catalytic components. It is preferred that the spheres be dried slowly and also that the drying be effected in a humid atmosphere since it has been found to result in less breakage of the spheres.

The silica-alumina spheroidal particles prepared according to the method of this invention may be composited with any of the several catalytically active metallic materials in the oxidized or reduced state. Of particular interest are those catalytic composites comprising one or more metals of Groups VIB and VIII including molybdenum, tungsten, chromium, iron, nickel, cobalt, platinum, palladium, ruthenium, rhodium, osmium and iridium. Thus, silica-alumina spheres prepared in accordance with the method of this invention can be utilized advantageously as a catalyst or component thereof to effect a variety of hydrocarbon conversion reactions involving reaction conditions comprising a temperature in the 25°-750° C. range. The catalysts are particularly useful in effecting the hydrocracking of heavy oils, including vacuum residuals, to form petroleum products in the middle distillate range utilizing a temperature of from about 250° to about 550° C., and pressures of from about 500 to about 2,000 psig. Said hydrocarbon conversion reactions further include the polymerization of olefins, particularly ethylene, propylene, 1-butene, 2-butene, isobutylene, and also higher boiling olefins, at polymerization reaction conditions. The silica-alumina product is also useful as a catalyst or component thereof in effecting the alkylation of isoparaffins with olefins for other alkylating agents including, for example, alkyl halides and the like; and also the alkylation of isobutane, isopentane, and/or isohexane with ethylene, propylene, 1-butene, etc., or mixtures thereof; and also the alkylation of aromatics with olefins or other alkylating agents, particularly the alkylation of benzene, toluene, etc., with propylene, butylene, and higher boiling olefins including nonenes, decenes, undecenes, etc., the foregoing alkylation reactions being effected at alkylation conditions disclosed in the art. The products of this invention are further useful in the isomerization of paraffins, particularly n-butane, n-pentane, n-hexane, n-heptane, n-octane, etc., or mixtures thereof, including the isomerization of less highly branched chain saturated hydrocarbons to more highly branched chain saturated hydrocarbon such as the isomerization of 2- or 3-methylpentane to 2, 3- and 2, 2-dimethylbutane; isomerization of naphthenes, for example, the isomerization of dimethylcyclopentane to methylcyclohexane, the isomerization of methylcyclopentane to cyclohexane, etc., at isomerization reaction conditions. Other hydrocarbon conversion reactions including transalkylation reactions, and the reforming of gasoline or naptha to improve the antiknock characteristics thereof, are effectively catalyzed using the silica-alumina spheroidal product of this invention as a catalyst or component thereof.

The following examples are presented in illustration of one preferred embodiment of this invention and are not intended as an undue limitation of the generally broad scope of the invention as set out in the appended claims.

EXAMPLE I

In the preparation of an acidified sodium silicate solution containing chloride anions and sodium in a 1.2:1 ratio, 340 cubic centimeters of a 23.5% aqueous sodium silicate solution (water glass) was diluted to 460 cubic centimeters with water and admixed with 127 cubic centimeters of 31% hydrochloric acid and 180 cubic centimeters of a 40% aqueous urea solution at a temperature of about 6° C. The acidified sodium silicate solution (104 gms. $SiO_2$) was then admixed with 280 cubic centimeters of an acidic alumina sol (104 gms. $Al_2O_3$), the mixture being maintained at about 6° C. The alumina sol was prepared by digesting aluminum in dilute hydrochloric acid under reflex conditions—about 102° C.—to provide an alumina sol containing about 14 wt. % aluminum in about a 1.5:1 ratio with a chloride anion content thereof. The sol mixture was then dispersed as droplets in a hot gas oil maintained in a forming tower at 95° C. The spheroidal hydrogel particles suitable for further processing were recovered in about a 25% yield. The poor yield was largely the result of improper gelation of a large quantity of the spheroidal hydrogel particles permitting the agglomeration of said particles at the bottom of the forming tower.

EXAMPLE II

The preparation of Example I was repeated substantially as described except that the aqueous sodium silicate solution was acidified with hydrochloric acid to provide an acid anion/sodium ratio of about 0.95, and with glacial acetic acid to increase said ratio by a factor of about 1.37. In the preparation, 340 cubic centimeters of a 23.5% aqueous sodium silicate solution was diluted to 460 cubic centimeters with water and admixed with 100 cubic centimeters of 31% hydrochloric acid, 20 cubic centimeters of glacial acetic acid and 180 cubic centimeters of a 40% aqueous urea solution at a temperature of about 6° C. The acidified sodium silicate solution was then admixed with 280 cubic centimeters of the described acidic alumina sol, and the sol mixture was dispersed as droplets in the hot gas oil maintained in the forming tower at about 95° C. The spheroidal hydrogel particles were recovered in 100% yield. The spheroidal particles were firm and not subject to agglomerization in the forming tower.

I claim as my invention:

1. A method of preparing silica-alumina macrospheres which comprises:
    (a) acidifying an aqueous alkali metal silicate solution with a strong mineral acid and a weak organic acid, the former being in sufficient concentration to provide an acid anion/alkali metal ratio of from about 0.75 to about 1.0, and the latter being in sufficient concentration to increase said ratio by a factor of from about 1.3 to about 2;
    (b) admixing the acidified solution with an acidic alumina sol and with sufficient urea to effect from about 150 to about 250% neutralization of the acid anion content of the mixture upon total hydrolysis or decomposition of said urea to ammonia;
    (c) dispersing the mixture as droplets in a hot oil bath effecting the formation of spheroidal hydrogel particles;
    (d) aging the particles in the hot oil;
    (e) washing and drying, and calcining the aged spheroidal particles.

2. The method of claim 1 further characterized with respect to Step (a) in that said alkali metal silicate is sodium silicate.

3. The method of claim 1 further characterized with respect to Step (a) in that said mineral acid is hydrochloric acid.

4. The method of claim 1 further characterized with respect to Step (a) in that said organic acid is acetic acid.

5. The method of claim 1 further characterized with respect to Step (b) in that said alumina sol is formed by digesting aluminum in aqueous hydrochloric acid.

6. The method of claim 1 further characterized with respect to Step (b) in that said alumina sol is utilized in an amount to provide a silica-alumina product comprising from about 25 to about 75 wt. % alumina.

7. The method of claim 1 further characterized with respect to Step (b) in that said alumina sol is an aluminum chloride sol comprising from about 10 to about 14 wt. % aluminum and from about a 1 to a 1.5 ratio with an acid anion content thereof.

8. The method of claim 1 further characterized with respect to Step (c) in that said oil bath is maintained at a temperature of from about 50° to about 105° C.

9. The method of claim 1 further characterized with respect to Step (d) in that said particles are aged in said oil at a temperature of from about 50° to about 150° C. for a period of from abouta 10 to about 40 hours.

10. The method of claim 1 further characterized with respect to Step (e) in that said particles are calcined at a temperature of from about 425° to about 750° C.

* * * * *